US008812715B2

United States Patent
Shi et al.

(10) Patent No.: US 8,812,715 B2
(45) Date of Patent: Aug. 19, 2014

(54) METHOD, SYSTEM, AND PROXY NODE FOR P2P STREAMING MEDIA DATA DISTRIBUTION

(75) Inventors: Guangyu Shi, Cupertino, CA (US); Youshui Long, Shenzhen (CN); Liufei Wen, Shenzhen (CN); Yunfei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/340,089

(22) Filed: Dec. 29, 2011

(65) Prior Publication Data

US 2012/0102116 A1  Apr. 26, 2012

Related U.S. Application Data

(63) Continuation of application No. PCT/CN2010/074555, filed on Jun. 26, 2010.

(30) Foreign Application Priority Data

Jul. 1, 2009 (CN) .......................... 2009 1 0108611

(51) Int. Cl.
*G06F 15/16* (2006.01)

(52) U.S. Cl.
USPC ........... 709/231; 709/204; 709/212; 709/213; 709/218; 709/219; 370/401

(58) Field of Classification Search
USPC .................................. 370/230, 235; 709/231
See application file for complete search history.

(56) References Cited

U.S. PATENT DOCUMENTS

| | | | |
|---|---|---|---|
| 6,415,323 B1 * | 7/2002 | McCanne et al. | 709/225 |
| 6,611,872 B1 * | 8/2003 | McCanne | 709/238 |
| 7,818,402 B1 * | 10/2010 | Zhang | 709/219 |
| 2003/0174648 A1 | 9/2003 | Wang et al. | |
| 2003/0204602 A1 | 10/2003 | Hudson et al. | |
| 2004/0024900 A1 * | 2/2004 | Breiter et al. | 709/231 |

(Continued)

FOREIGN PATENT DOCUMENTS

| | | |
|---|---|---|
| CN | 1595905 A | 3/2005 |
| CN | 101282281 A | 10/2008 |

OTHER PUBLICATIONS

Begen, A.C.; Altunbasak, Y.; Begen, M.A., "Rate-distortion optimized on-demand media streaming with server diversity," Sep. 14-17, 2003, Proceedings of 2003 International Conference on Image Processing, vol. 3, pp. III,657-60 vol. 2.*

(Continued)

*Primary Examiner* — Jason K. Gee
*Assistant Examiner* — Zhimei Zhu
(74) *Attorney, Agent, or Firm* — Conley Rose, P.C.; Grant Rodolph

(57) ABSTRACT

A method for Peer-to-Peer (P2P) streaming media data distribution includes: receiving a media resource request message sent by a Client node, and sending a media resource query request corresponding to the message to multiple resource networks; obtaining response messages to the media resource query request; confirming Cache nodes storing the media resource according to the response messages; and requesting the media resource from the Cache nodes. The present invention further provides a system and a Proxy node for streaming media data distribution, thereby expanding an application range of live/on-demand service of a user, and increasing the flexibility of a system for streaming media distribution.

16 Claims, 4 Drawing Sheets

(56) References Cited

U.S. PATENT DOCUMENTS

| | | | |
|---|---|---|---|
| 2005/0005025 A1* | 1/2005 | Harville et al. | 709/241 |
| 2005/0010653 A1* | 1/2005 | McCanne | 709/219 |
| 2005/0097213 A1* | 5/2005 | Barrett et al. | 709/231 |
| 2006/0184688 A1* | 8/2006 | Ganguly et al. | 709/232 |
| 2007/0130361 A1* | 6/2007 | Li | 709/231 |
| 2007/0266169 A1* | 11/2007 | Chen et al. | 709/231 |
| 2008/0091840 A1 | 4/2008 | Guo et al. | |
| 2008/0301214 A1* | 12/2008 | Li et al. | 709/201 |
| 2009/0106393 A1* | 4/2009 | Parr et al. | 709/218 |
| 2009/0113253 A1 | 4/2009 | Wang et al. | |
| 2009/0198790 A1* | 8/2009 | Grevers, Jr. | 709/213 |
| 2010/0235528 A1* | 9/2010 | Bocharov et al. | 709/231 |
| 2010/0312851 A1* | 12/2010 | Jackson et al. | 709/217 |
| 2010/0332621 A1* | 12/2010 | Ljunggren et al. | 709/219 |

OTHER PUBLICATIONS

Extended European Search Report dated (mailed) Apr. 5, 2012, issued in related Application No. 10793584.3-1244, PCT/CN20100074555, Hauwei Technologies Co., Ltd.

Banerjee, et al., "Scalable Resilient Media Streaming", NOSSDAV, pp. 1-6, (Jun. 16-18, 2004).

Zhang, et al., "Problem Statement of P2P Streaming Protocol (PPSP), draft-zhang-ppsp-problem-statement-06.txt", PSP Internet Draft, pp. 1-22, (Jul. 12, 2010).

International Search Report from the Chinese Patent Office in International Application No. PCT/CN2010/074555, mailed Sep. 23, 2010.

Foreign Communication From a Counterpart Application, PCT Application PCT/CN2010/074555, English Translation of Written Opinion dated Sep. 23, 2010, 3 pages.

First Chinese Office Action mailed Jun. 5, 2012, issued in related Chinese Application Partial No. 200910108611.7, Huawei Technologies Co., Ltd. (13 pages).

Foreign Communication From a Counterpart Application, European Application No. 13162202.9, Extended European Search Report dated Aug. 22, 2013, 6 pages.

\* cited by examiner

METHOD, SYSTEM, AND PROXY NODE FOR P2P STREAMING MEDIA DATA DISTRIBUTION

CROSS-REFERENCE TO RELATED APPLICATIONS

This application is a continuation of International Application No. PCT/CN2010/074555, filed on Jun. 26, 2010, which claims priority to Chinese Patent Application No. 200910108611.7, filed on Jul. 1, 2009, both of which are hereby incorporated by reference in their entireties.

FIELD OF THE INVENTION

The present invention relates to the field of communications technologies, and in particular, to a method, a system, and a proxy node for Peer-to-Peer (P2P) streaming media data distribution.

BACKGROUND OF THE INVENTION

With the emergence of the technologies such as the P2P network and the overlay network, the Application Layer Multicast (ALM) technology is widely applied in the live/on-demand streaming media video. In the application layer technology, the original "unicast and best effort delivery" model of the Internet is maintained, the architecture of the original network is not changed, and the multicast function is implemented mainly by adding the functions of the end system. In the prior art, the multicast and the management of the application layer are implemented mainly through the Overlay node based on the P2P ALM algorithms.

The conventional ALM is implemented mostly by defining the private media distribution protocol based on the Transmission Control Protocol (TCP), causing that a user terminal has to match the multicast network to enjoy the live/on-demand service, so an application range of the live/on-demand service in the prior art is quite small, and the flexibility thereof is quite low.

SUMMARY OF THE INVENTION

Embodiments of the present invention provide a method, a system, a proxy node, an access device, and an access server for P2P streaming media data distribution, so as to expand an application range of services and increase the flexibility of a system for streaming media distribution.

An embodiment of the present invention provides a method for P2P streaming media data distribution, including:

receiving a media resource request message sent by a Client node, and sending a media resource query request corresponding to the message to multiple resource networks;

obtaining response messages to the media resource query request;

confirming Cache nodes storing the media resource according to the response messages; and requesting the media resource from the Cache nodes.

An embodiment of the present invention further provides a Proxy node, where the Proxy node is applied to streaming media data distribution, including:

a Client response unit, configured to receive a media resource request message sent by a Client node;

a multicast interface unit, configured to send a media resource query request corresponding to the message to multiple resource networks, obtain response messages to the media resource query request, and confirm Cache nodes storing the media resource according to the response messages; and a streaming media transmission unit, configured to request the media resource from the Cache nodes.

An embodiment of the present invention further provides an access device, including:

a Client response unit, configured to receive a media resource request message sent by a Client node;

a multicast interface unit, configured to send a media resource query request corresponding to the message to multiple resource networks, obtain response messages to the media resource query request sent by the multiple resource networks, and confirm Cache nodes storing the media resource according to the response messages; and a streaming media transmission unit, configured to request the media resource from the Cache nodes.

An embodiment of the present invention further provides an access server, including:

a Client response unit, configured to receive a media resource request message sent by a Client node;

a multicast interface unit, configured to send a media resource query request corresponding to the message to multiple resource networks, obtain response messages to the media resource query request sent by the multiple resource networks, and confirm Cache nodes storing the media resource according to the response messages; and a streaming media transmission unit, configured to request the media resource from the Cache nodes.

An embodiment of the present invention further provides a system for streaming media data distribution, including:

a Proxy node, configured to receive a media resource request message sent by a Client node, and send a media resource query request corresponding to the message; and multiple resource networks, configured to send response messages to the media resource query request to the Proxy node;

where the Proxy node is further configured to confirm Cache nodes storing the media resource according to the response messages, and request the media resource from the Cache nodes.

According to the technical solutions provided by the present invention, a user terminal may obtain relevant information of Cache nodes corresponding to a required media resource from multiple resource networks through a Proxy node, so as to obtain the media resource from the Cache nodes through the Proxy node, so that the user terminal does not need to match a multicast network, thereby expanding an application range of the live/on-demand service of a user, and increasing the flexibility of a system for streaming media distribution.

DETAILED DESCRIPTION OF THE EMBODIMENTS

The technical solutions in the embodiments of the present invention are clearly and fully described below with reference to the accompanying drawings. Apparently, the embodiments to be described are only a part rather than all of the embodiments of the present invention. All other embodiments derived by persons of ordinarily skill in the art based on the embodiments of the present invention without any creative effort should fall within the protection scope of the present invention.

According to the embodiments of the present invention, a system for streaming media data distribution is provided by absorbing an advantage of high transmission efficiency of streaming media through the Real Time Streaming Protocol (RTSP) and combining an ALM technology, so as to solve problems that the conventional P2P ALM faces, thereby enabling the P2P ALM to have the disadvantages, such as strong expandability, flexible deployment, and high transmission efficiency.

Figure 1:
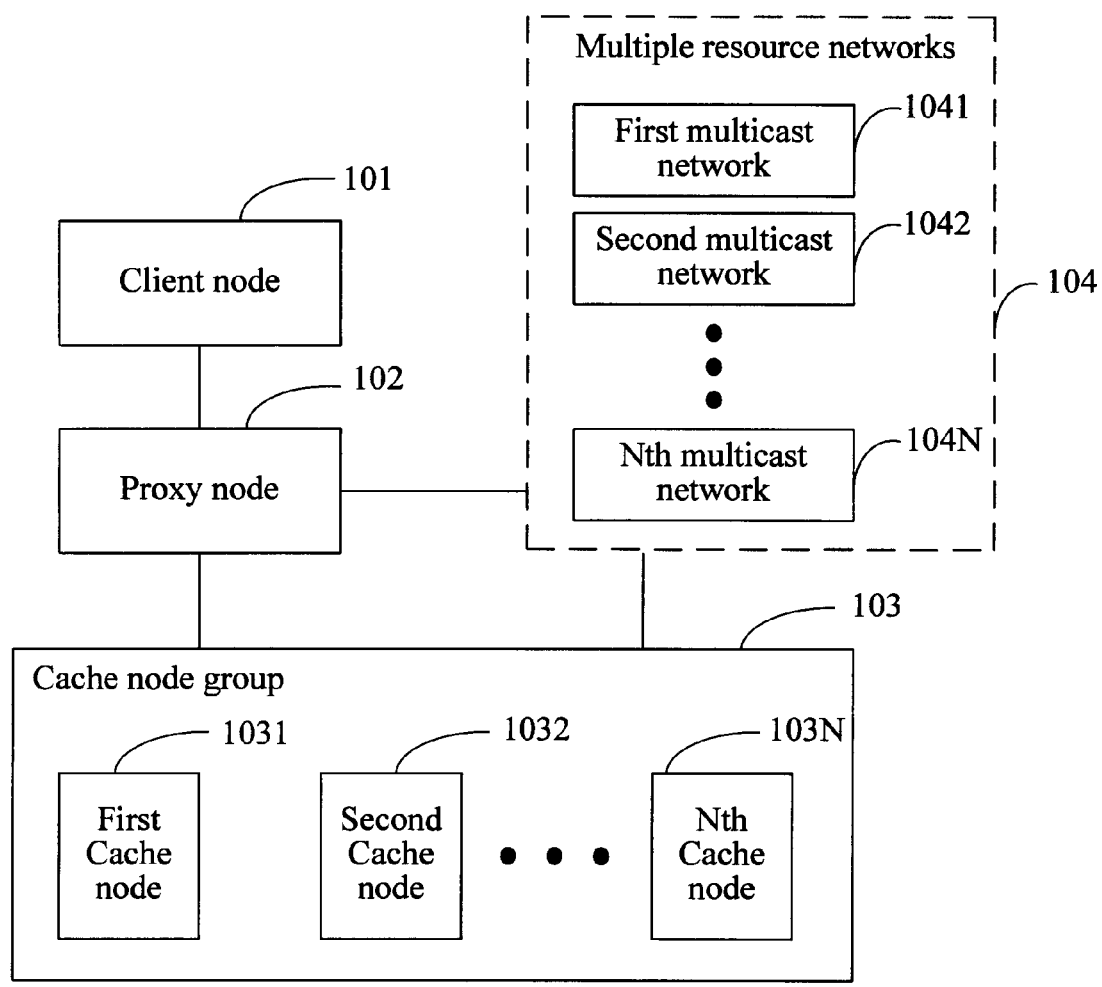
FIG. 1 is a schematic diagram of a system for streaming media distribution according to an embodiment of the present invention.

FIG. 1 is a schematic diagram of a system for streaming media distribution. In this embodiment, FIG. 1 may be a schematic diagram of a system for P2P streaming media data distribution.

The system for P2P streaming media data distribution according to the embodiment of the present invention includes a Client node 101, a Proxy node 102, a Cache node group 103, and multiple resource networks 104. In this embodiment, the multiple resource networks 104 may be a P2P multicast network group, or multiple resource networks formed by P2P multicast networks and media distribution networks. In this embodiment, the multiple resource networks 104 include multiple different multicast networks, which may be a first multicast network 1041, a second multicast network 1042, ..., and an Nth multicast network 104N. In this embodiment, the Cache node group 103 includes multiple Cache nodes, which may be a first Cache node 1031, a second Cache node 1032, ..., and an Nth Cache node 103N. In this embodiment, the multiple different multicast networks of the resource networks 104 may be provided by different network operators.

The Client node 101 is configured to respond to a streaming media request of a user, send an RTSP request message to the Proxy node 102 according to the streaming media request of the user, obtain media data from the Proxy node 102, and play the media data. In this embodiment, the streaming media request of the user may be a streaming media demand request of the user. The RTSP request message includes media resource information requiring to be obtained by the user, where the media resource information is provided by the user or obtained by the Client node 101 in combination with the streaming media request of the user through other modes, for example, the Client node 101 obtains the corresponding media resource information after the user clicks a streaming media demand page. In this embodiment, the Client node 101 is required to support the RTSP.

The Proxy node 102 is configured to respond to the RTSP request message sent by the Client node 101; and obtain a Universal Resource Identifier (URI) corresponding to the media resource requested by the Client node 101 according to the RTSP request message. In this embodiment, the Proxy node 102 obtains the URI corresponding to the media resource according to the media resource information requiring to be obtained by the user in the RTSP request message.

In this embodiment, the Proxy node 102 is further configured to send the media resource query request carrying the URI information to the multiple resource networks 104. In this embodiment, the Proxy node 102 may send the media resource query request to any one multicast network of the multiple resource networks 104, or may send the media resource query request to multiple different multicast networks at the same time. In this embodiment, the Proxy node 102 may record situations of the multicast networks in the multiple resource networks 104, and it may be understood that, the number of the multicast networks, operators of the multicast networks, and operation states of the multicast networks of the multiple resource networks 104 are recorded. In this embodiment, the Proxy node 102 may select the multicast networks of the multiple resource networks 104 according to the recorded situations of the multicast networks of the multiple resource networks 104, and sends the media resource query request to the selected multicast networks.

The multicast network of the multiple resource networks 104 is configured to receive the media resource query request sent by the Proxy node 102, query location information of the Cache nodes storing the media resource and fragment storage information of the corresponding media resource through a P2P network according to the URI of the media resource requiring to be queried in the resource query request, and select a group of suitable Cache nodes and a mode for requesting the media resource of the Cache nodes according to an ALM algorithm. The multiple resource networks 104 returns response messages corresponding to the resource query request, where the response message includes the location information of the selected group of Cache nodes storing the media resource, the fragment storage information of the corresponding media resource, and the mode for requesting the resource of the Cache nodes. The corresponding mode for requesting the media is a push/pull request operation for obtaining the media resource. In this embodiment, the number of the suitable Cache nodes in the selected group may be one or more.

The Proxy node 102 is further configured to receive the response messages corresponding to the resource query request sent by the multiple resource networks 104, and confirm the Cache nodes storing the media resource according to the response messages. In this embodiment, the Proxy node 102 obtains the location information of the selected group of Cache nodes storing the media resource in the response messages, the fragment storage information of the corresponding media resource, and the mode for requesting the resource of the Cache nodes. In this embodiment, the Proxy node 102 is further configured to select several Cache nodes as resource nodes from the Cache nodes corresponding to the location information of the selected group of Cache nodes storing the media resource in the response messages, according to the fragment storage information of the media resource stored by the node in combination with the fragment storage information of the media resource of the Cache nodes returned by the multiple resource networks 104, that is, confirm the Cache nodes storing the media resource, and convert the mode for requesting the media resource of the resource nodes returned by the multiple resource networks 104 into pull/push operational primitives.

The Proxy node 102 is further configured to request media transmission from the several Cache nodes selected as the resource nodes in Cache node group 103 through the pull/push operational primitives, according to the location information of the corresponding Cache nodes returned by the multiple resource networks 104. It may be understood that the Proxy node 102 requests the media transmission from the resource nodes through the pull/push operational primitives according to the location information of the selected resource nodes, that is, the location information of the Cache nodes selected as the resource nodes.

The Proxy node 102 receives media streams of the several Cache nodes of the Cache node group 103, converges and combines the media streams, and then transmits the media streams to the Client node 101 through the RTSP. The URI is the URI of the media resource requested by the user, which needs to be specifically determined according to different application scenarios, and for example, the URI may be a streaming media file or a certain fragment or several fragments in a streaming media file.

Each Cache node of the Cache node group 103 is configured to cache the media resource, and register cached resource information with the multicast networks of the multiple resource networks 104. In this embodiment, the Cache nodes may register the cached resource information with any multicast network of the multiple resource networks 104 or with the multiple different multicast networks at the same time.

In this embodiment, the Cache node may be a dedicated server in the system for streaming media distribution, or may be a cache server participating in multiple adjacent service networks at the same time, and provide resource sharing and interaction for resources among different service networks, for example, the Cache node may participate in the multiple multicast networks at the same time, and provide a Cache service for the multiple multicast networks. That is, the Cache nodes may register with the multiple multicast networks, namely, the Cache nodes may provide resource information for the multiple multicast networks, thereby providing the resource sharing for the multiple multicast networks.

The logic functions above may be mapped to be respectively independent physical devices, or any combination formed of the logic functions is located on a same physical device, or the logic functions are respectively the independent processes on one physical device, or the logic functions may be used as one process on one physical device.

According to the system for streaming media distribution provided by the embodiment of the present invention, the Proxy node is added to the system for streaming media distribution, so that the user terminal may obtain the relevant information of the Cache nodes corresponding to the required media resource from the different multicast networks through the Proxy node, so as to obtain the media resource from the Cache nodes through the Proxy node, so that the user may enjoy the live/on-demand services through the different multicast networks, thereby improving the application range of the live/on-demand service, so as to avoid the situation in the prior art that the user terminal has to match the multicast network to enjoy the live/on-demand service, thereby enhancing the expandability and the flexibility of the system for streaming media distribution.

As a streaming media transmission mode of the ALM is abstracted into the push/pull mode, and the streaming media transmission of the multicast network is implemented in combination with the RTSP, so a transmission efficiency of the streaming media multicast system is improved.

Figure 2:
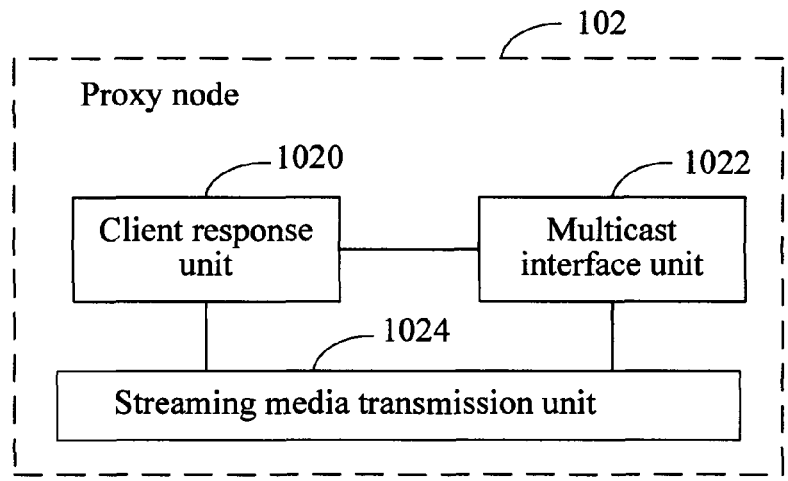
FIG. 2 is a schematic diagram of a Proxy node according to an embodiment of the present invention.

FIG. 2 is a schematic structural diagram of a Proxy node, which includes a Client response unit 1020, a multicast interface unit 1022, and a streaming media transmission unit 1024. In this embodiment, the multicast interface unit 1022 may also be a P2P ALM interface unit.

The Client response unit 1020 is configured to receive an RTSP request message sent by a Client node, and obtain a URI corresponding to a media resource required by the Client node according to the media resource information requiring to be obtained by a user in the RTSP request message.

The multicast interface unit 1022 is configured to send a media resource query request corresponding to the RTSP request message to multiple resource networks, obtain response messages to the media resource query request, and confirm Cache nodes storing the media resource according to the response messages. In this embodiment, the multicast interface unit 1022 sends the media resource query request to multicast networks of the multiple resource networks, according to the URI corresponding to the media resource sent by the Client response unit 1020, obtains location information of the Cache nodes storing the media resource, fragment storage information of the corresponding media resource, and a mode for requesting the media resource of the Cache nodes from the response messages returned by the multicast networks. In this embodiment, the multicast interface unit 1022 is further configured to select several Cache nodes as resource nodes from the Cache nodes corresponding to the location information of Cache nodes in the response messages, according to the fragment storage information of the media resource stored by the node in combination with the fragment storage information of the media resource of the Cache nodes returned by multiple resource networks, that is, confirm the Cache nodes storing the media resource, and convert the mode for requesting the media resource of the resource nodes returned by the resource networks into pull/push operational primitives.

The streaming media transmission unit 1024 is configured to request media transmission from the several Cache nodes selected as the resource nodes through the pull/push operational primitives, according to the location information of the Cache nodes returned by the multicast networks. It may be understood that the streaming media transmission unit 1024 requests the media transmission from the resource nodes through the pull/push operational primitives according to the location information of the resource nodes selected by the multicast interface unit 1022, that is, the location information of the Cache nodes selected as the resource nodes.

In this embodiment, the streaming media transmission unit 1024 is further configured to receive media streams of the several Cache nodes, and converge and combine the media streams.

The Client response unit 1020 is further configured to send the media streams received by the streaming media transmission unit 1024 to the Client node through the RTSP.

In this embodiment, the Proxy node may be deployed in a dedicated server of the streaming media multicast network, or may be deployed in a device combined with a Content Delivery Network (CDN) server, or may be deployed in a device combined with an access gateway, for example, a cable network access server or a Broadband Remote Access Server (BRAS), or a wireless network access device, or a Gateway General Packet Radio Service (GPRS) Supporting Node (GGSN), or a GPRS router, and definitely, the Proxy node may also be combined with the terminal, that is, deployed on a Personal Computer (PC) terminal having better performances. That is, the dedicated server of the streaming media multicast network, or CDN server, or the cable network access server, or the BRAS, or the wireless network access device, or the GGSN includes the units of the Proxy node, which are not described here again.

According to the Proxy node provided by the embodiment of the present invention, the user terminal may obtain the relevant information of the Cache nodes corresponding to the required media resource from the different multicast networks through the Proxy node, so as to obtain the media resource from the Cache nodes through the Proxy node, so that the user may enjoy the live/on-demand service through the different multicast networks, thereby improving the application range of the live/on-demand service, so as to avoid the situation in the prior art that the user terminal has to match the multicast network to enjoy the live/on-demand service, thereby enhancing the expandability and the flexibility of the system for streaming media distribution, and improving the efficiency and the anti-congestion capability of the streaming media transmission through the RTSP.

Figure 3:
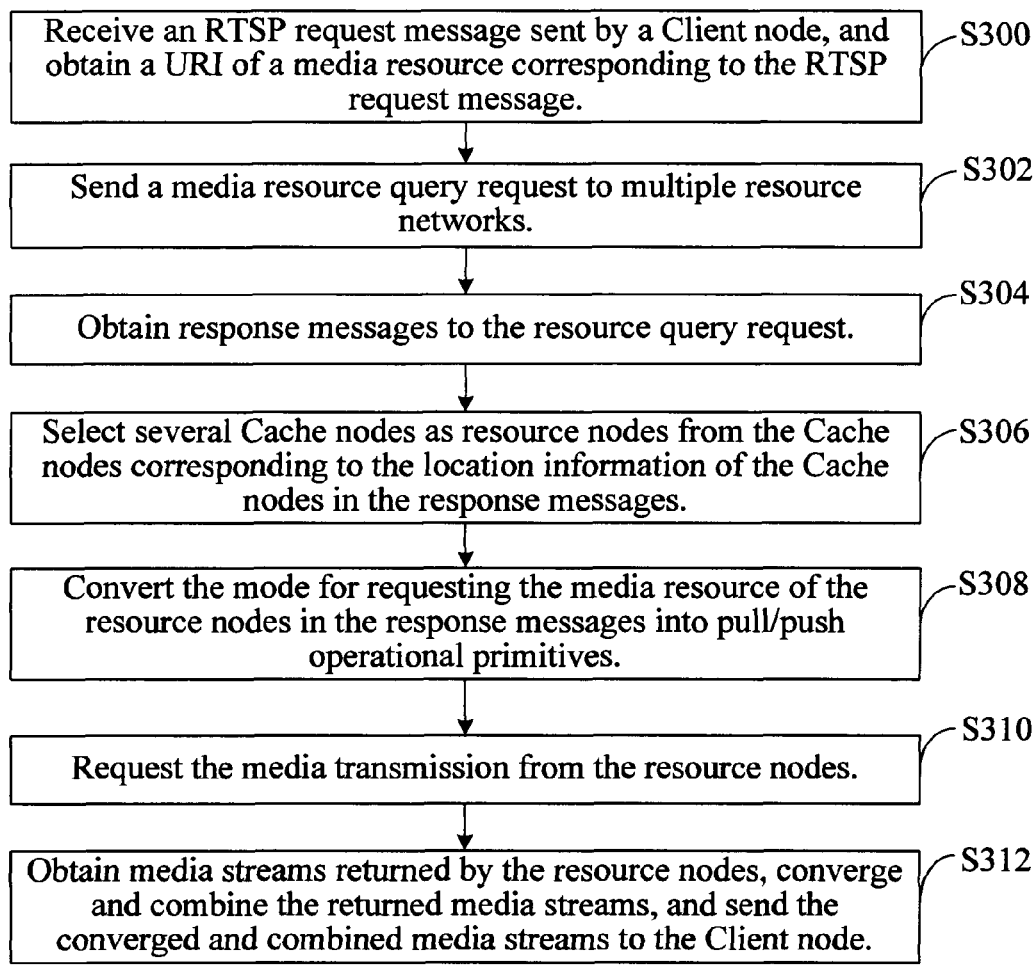
FIG. 3 is an overall flow chart of a method for P2P streaming media distribution according to an embodiment of the present invention.

FIG. 3 is an overall flow chart of a method for P2P streaming media distribution.

Step S300: An RTSP request message sent by a Client node is received, and a URI of a media resource corresponding to the RTSP request message is obtained. In this embodiment, the URI corresponding to the media resource requested by the Client node is obtained according to media resource information requiring to be obtained by the user in the RTSP request message.

Step S302: A media resource query request is sent to multiple resource networks. In this embodiment, the resource query request includes a URI of the media resource. In this embodiment, the multiple resource networks include multiple different multicast networks. In this embodiment, the media resource query request may be sent to any multicast network of the multiple resource networks, and may also be sent to multiple different multicast networks at the same time. In this embodiment, the Proxy node may not know which specific multicast network has the relevant information of the Cache nodes storing the requested media resource, so the media resource query request may be sent to the multiple different multicast networks, or may be sent to any selected multicast network.

Step S304: Response messages to the resource query request sent by the multiple resource networks are received. In this embodiment, the response message includes location information of the Cache nodes storing the media resource, fragment storage information of the media resource corresponding to the Cache nodes, and a mode for requesting the media resource of the Cache nodes. In this embodiment, after receiving the resource query request, the multicast network of the multiple resource networks queries the location information of the Cache nodes storing the media resource and the fragment storage information of the corresponding media resource according to the URI of the media resource requiring to be queried in the resource query request, and selects a group of suitable Cache nodes and the mode for requesting the media resource of the Cache nodes according to an ALM algorithm. In this embodiment, the response messages sent by the multiple multicast networks of the multiple resource networks may be obtained, and when it is assumed that the multiple resource networks include two multicast networks, which are respectively a first multicast network and a second multicast network, a response message sent by the first multicast network may be received, and a response message sent by the second multicast network may be received. The same Cache node registers with the first multicast network and the second multicast network, so the response message sent by the first multicast network and the response message sent by the second multicast network may include the location information of the Cache node at the same time.

Step S306: Several Cache nodes are selected as resource nodes from the Cache nodes corresponding to the location information of the Cache nodes in the response messages. In this embodiment, according to the fragment storage information of the stored media resource and the fragment storage information of the media resource corresponding to the Cache nodes in the response message, several Cache nodes are selected as the resources nodes from the Cache nodes corresponding to the location information of the Cache nodes in the response message. The step may be understood as that the Cache nodes storing the media resource are confirmed according to the response message. In this embodiment, several Cache nodes are selected as the resource nodes from the Cache nodes corresponding to the location information of the Cache nodes in the response message sent by the different multicast networks.

Step S308: The mode for requesting the media resource of the resource nodes is converted into pull/push operational primitives. In step S306, several Cache nodes are selected as the resource nodes from the Cache nodes corresponding to the location information of the Cache nodes in the response messages, so the step may be understood as that the mode for requesting the media resource of the selected Cache nodes is converted into the pull/push operational primitives.

Step S310: The media transmission is requested from the resource node. In this embodiment, the media transmission is requested from the resource node through the pull/push operational primitives according to the location information of the resource node. In step S306, several Cache nodes are selected as the resource nodes from the Cache nodes corresponding to the location information of the Cache nodes in the response messages, so the step may be understood as that the media transmission is requested from the Cache node through the pull/push operational primitives according to the location information of the selected Cache node.

Step S312: Media streams returned by the resource nodes are obtained, the returned media streams are converged and combined, and the converged and combined media streams are sent to the Client node.

In this embodiment, the method for streaming media distribution may be performed on a Proxy node, a Proxy server, or an entity capable of implementing a Proxy function.

According to the technical solutions provided by the present invention, the user terminal may obtain the relevant information of the Cache nodes corresponding to the required media resource from the different multicast networks of multiple resource networks through the Proxy node, so as to obtain the media resource from the Cache nodes through the Proxy node, so that the user may enjoy the live/on-demand service through the different multicast networks, thereby improving the application range of the live/on-demand service, so as to avoid the situation in the prior art that the user terminal has to match the multicast network to enjoy the live/on-demand service, thereby enhancing the expandability and the flexibility of the system for streaming media distribution.

Figure 4A:
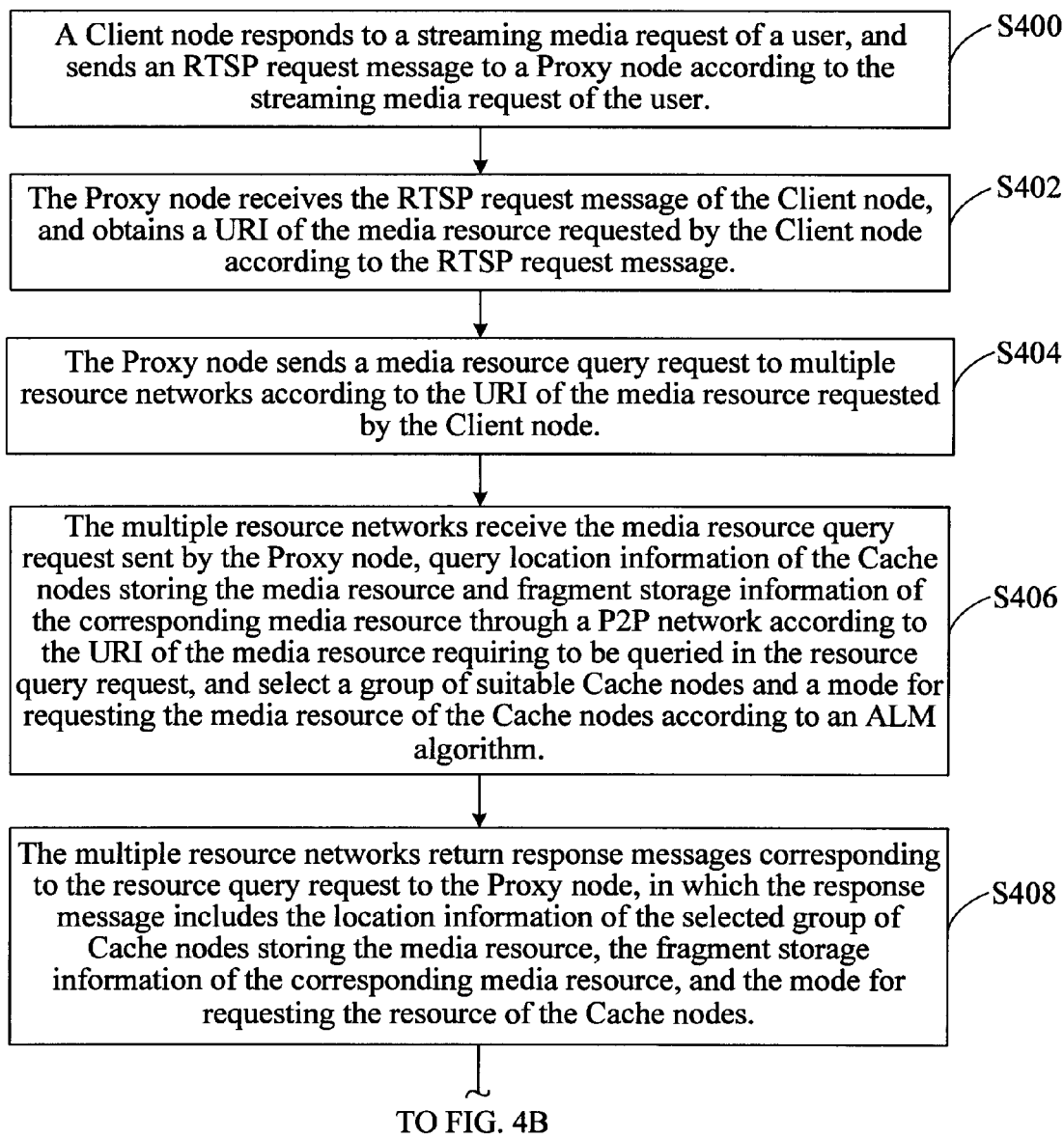
FIGS. 4A and 4B are a specific flow chart of a method for P2P streaming media distribution according to an embodiment of the present invention.
Figure 4B:
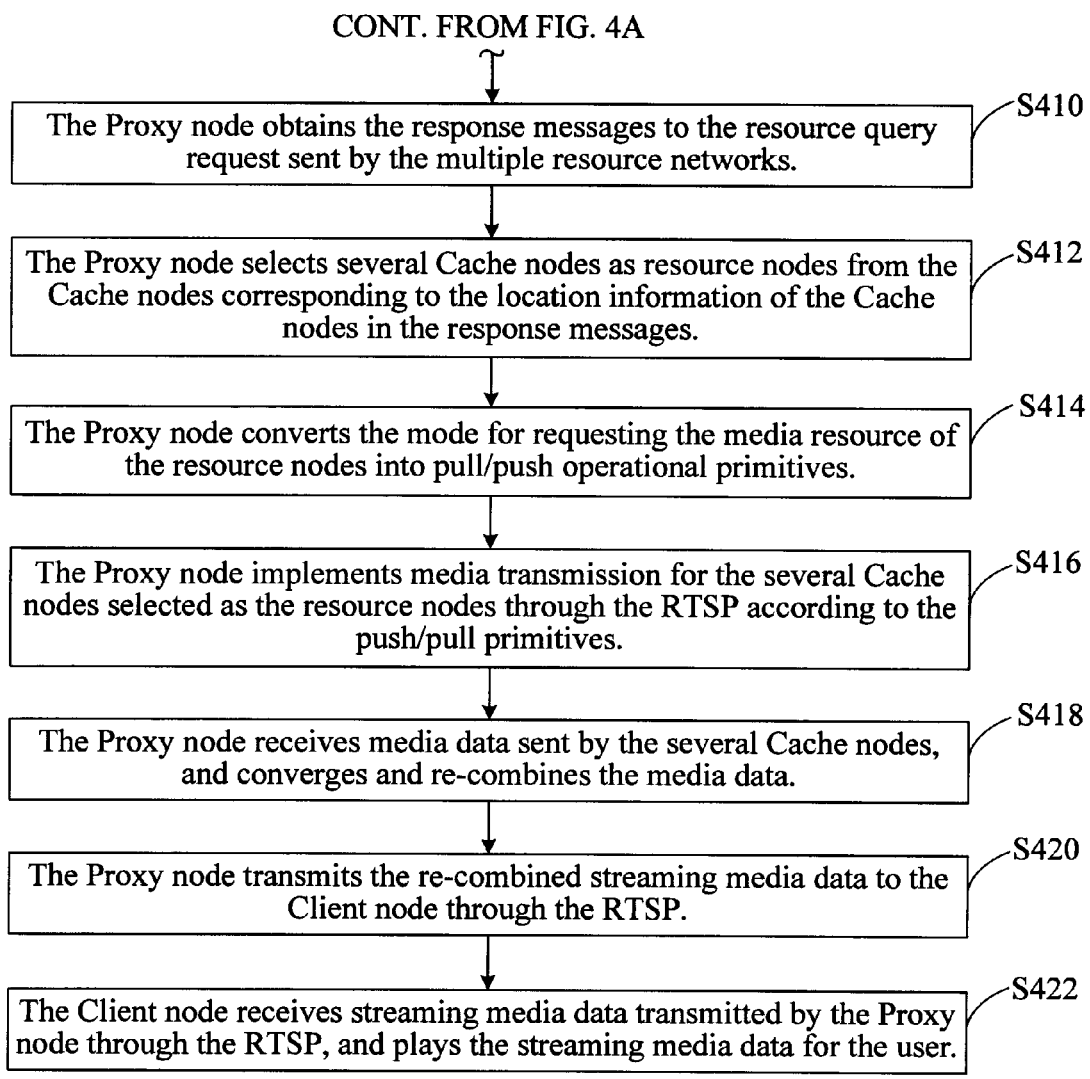

FIGS. 4A and 4B are a specific flow chart of a method for P2P media distribution, which includes the following steps.

Step S400: A Client node responds to a streaming media request of a user, and sends an RTSP request message to a Proxy node according to a streaming media request of the user. In this embodiment, the Client node obtains media resource information requested in the streaming media request of the user, and sends the RTSP request message corresponding to the media resource. The RTSP request message includes the media resource information requiring to be obtained by the user, and it may be understood that the RTSP request message carries the media resource information requiring to be obtained by the user.

Step S402: The Proxy node receives the RTSP request message of the Client node, and obtains a URI of the media resource requested by the Client node according to the RTSP request message. In this embodiment, the URI corresponding to the media resource requested by the Client node is obtained according to the media resource information requiring to be obtained by the user in the RTSP request message.

Step S404: The Proxy node sends a media resource query request to multiple resource networks according to the URI of the media resource requested by the Client node. In this embodiment, the multiple resource networks include multiple different multicast networks. In this embodiment, the media resource query request may be sent to any multicast network of the multiple resource networks, and may also be sent to multiple different multicast networks at the same time. In this embodiment, the Proxy node may not know which specific multicast network has the relevant information of the Cache nodes storing the requested media resource, so the media resource query request may be sent to the multiple different multicast networks, or may be sent to any selected multicast network.

Step S406: The multiple resource networks receive the media resource query request sent by the Proxy node, query location information of the Cache nodes storing the media resource and fragment storage information of the corresponding media resource through a P2P network according to the URI of the media resource requiring to be queried in the resource query request, and select a group of suitable Cache nodes and a mode for requesting the media resource of the Cache nodes according to an ALM algorithm. In this embodiment, one multicast network of the multiple resource networks receives the resource query request sent by the Proxy node, or multiple different multicast networks receive the request query request sent by the Proxy node.

Step S408: The multiple resource networks return response messages corresponding to the resource query request to the Proxy node, where the response message includes the location information of the selected group of Cache nodes storing the media resource, the fragment storage information of the corresponding media resource, and the mode for requesting the resource of the Cache nodes. The mode for requesting the media resource is a common push/pull media transmission mode in the ALM.

Step S410: The Proxy node obtains the response messages to the resource query request sent by the multiple resource networks. In this embodiment, the response messages sent by the multiple multicast networks of the multiple resource networks may be obtained. When it is assumed that the multiple resource networks include two multicast networks, which are respectively a first multicast network and a second multicast network, a response message sent by the first multicast network may be received, and a response message sent by the second multicast network may be received. The same Cache node registers with the first multicast network and the second multicast network at the same time, so the response message sent by the first multicast network and the response message sent by the second multicast network may include the location information of the Cache node at the same time.

Step S412: Several Cache nodes are selected as resource nodes from the Cache nodes corresponding to the location information of the Cache nodes in the response messages. In this embodiment, according to the fragment storage information of the stored media resource and the fragment storage information of the media resource corresponding to the Cache nodes in the response message, several Cache nodes are selected as the resource nodes from the Cache nodes corresponding to the location information of the Cache nodes in the response message. In this embodiment, several Cache nodes may be selected as the resource nodes from the Cache nodes corresponding to the location information of the Cache nodes in the response message sent by the different multicast networks.

Step S414: The Proxy node converts the mode for requesting the media resource of the resource nodes into pull/push operational primitives. The step may be understood as that the mode for requesting the media resource of the selected Cache nodes is converted into the pull/push operational primitives.

Step S416: Media transmission is implemented for the several Cache nodes selected as the resource nodes through the RTSP according to the push/pull primitives. The step may be understood as that the media transmission is requested from the Cache nodes through the pull/push operational primitives according to the location information of the selected Cache nodes. In this embodiment, the media transmission is requested from the resource node through the pull/push operational primitives according to the location information of the resource node.

A transmission process where the pull primitives are combined with the RTSP is as follows.

AA. The Proxy node requests the media resource of a specific fragment from Cache nodes through the RTSP PLAY request according to a Buffer state of the current node and the fragment storage information of the media resource of the Cache nodes.

BB. The Proxy node obtains the media resource of the specific fragment by carrying a Range header field in the PLAY request. A form of Range is: Range: smpte=a-b; or Range: npt=a-b; or Range: clock=a-b; where a is a starting point of the media resource, and b is an ending point of the media resource. In order to obtain multiple discontinuous media fragments of the resource nodes, multiple Range header fields may be carried in the PLAY request for identifying different fragments.

CC. The Cache nodes return the part of the media resource to the requesting node through the RTSP according to a range identified by the Proxy node in the Range header field of the PLAY request.

A transmission process where the push primitives are combined with the RTSP is as follows.

DD. The Proxy node implements periodic push of requesting the media resource from the Cache nodes through the RTSP PLAY method.

EE. The Proxy node obtains the media resource by carrying a Range header field in a PLAY request. A form of Range is: smpte=a-; or Range: npt=a-; or Range: clock=a-; where a is a starting point of the media resource.

FF. The Cache resource nodes push the media resource to the requesting node through the RTSP according to a range identified by the requesting node in the Range header field of the PLAY request.

Step S418: The Proxy node receives media data sent by the several Cache nodes, and converges and re-combines the media data.

Step S420: The Proxy node transmits the re-combined streaming media data to the Client node through the RTSP.

Step S422: The Client node receives streaming media data transmitted by the Proxy node through the RTSP, and plays the streaming media data for the user.

If the Proxy node and the Client node are located on a same physical device, data interaction between the Client node and the Proxy node as shown in step S400 and step S420 may be implemented in other modes, for example, communication between processes.

If the specific application scenario where the user data server is located does not require the user to request the data from the multiple Cache nodes, step S418 is not performed.

According to the technical solutions provided by the present invention, the user terminal may obtain the relevant information of the Cache nodes corresponding to the required media resource from the different resource networks through the Proxy node, so as to obtain the media resource from the Cache nodes through the Proxy node, so that the user may enjoy the live/on-demand service through the different multicast networks, thereby improving the application range of the live/on-demand service, so as to avoid the situation in the prior art that the user terminal has to match the multicast network to enjoy the live/on-demand service, thereby enhancing the expandability and the flexibility of the system for streaming media distribution.

Persons of ordinary skill in the art may understand that that all of or a part of processes in the method according to the embodiments may be implemented by a computer program instructing relevant hardware. The program may be stored in a computer readable storage medium. When the program is performed, the processes of the method according to the embodiments of the present invention are performed. The storage medium may be a magnetic disk, an optical disk, a read-only memory (ROM) or a random access memory (RAM).

The foregoing descriptions are only preferred embodiments of the invention, and are not meant to limit the scope of protection of the invention. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for Peer-to-Peer (P2P) streaming media data distribution, comprising:
    receiving a media resource request message sent by a Client node, wherein a media resource is identified in the media resource request message;
    sending a media resource query request corresponding to the media resource request message to a plurality of resource networks;
    obtaining a plurality of response messages in response to the media resource query request from the plurality of resource networks;
    selecting a plurality of Cache nodes that store the media resource according to the response messages;
    requesting the media resource from the selected Cache nodes;
    obtaining a plurality of media streams that correspond and to the media resource from the selected Cache nodes;
    combining the media streams that correspond to the media resource; and
    sending the combined media streams to the Client node.

2. The method according to claim 1, wherein receiving the media resource request message sent by the Client node comprises obtaining a Universal Resource Identifier (URI) corresponding to the media resource, and wherein sending the media resource query request corresponding to the media resource request message to the plurality of resource networks comprises sending the media resource query request comprising the URI to the plurality of resource networks.

3. The method according to claim 1, wherein selecting the Cache nodes that store the media resource according to the response messages comprises selecting at least two of selected Cache nodes that correspond to location information of the selected Cache nodes in the response messages, according to a fragment storage information of a stored media resource and a fragment storage information of the media resource that corresponds to the selected Cache nodes in the response message.

4. The method according to claim 3, wherein requesting the media resource from the selected Cache nodes comprises:
    converting a mode for requesting the media resource of the selected Cache nodes in the response messages into pull/push operational primitives; and
    requesting media transmission from the selected Cache nodes through the pull/push operational primitives, according to the location information of the selected Cache nodes.

5. A Proxy node, wherein the Proxy node is applied to streaming media data distribution, comprising:
    a processor; and
    a non-transitory computer readable medium storing instructions that cause the processor to:
    receive a media resource request message sent by a Client node, wherein a media resource is identified in the media resource request message;
    send a media resource query request corresponding to the media resource request message to a plurality of resource networks;
    obtain a plurality of response messages in response to the media resource query request from the resource networks;
    select a plurality of Cache nodes that store the media resource according to the response messages;
    request the media resource from the selected Cache nodes;
    obtain a plurality of media streams that correspond to the media resource from the selected cache nodes;
    combine the media streams that correspond to the media resource; and
    send the combined media streams to the Client node.

6. The Proxy node according to claim 5, wherein the instructions further cause the processor to obtain a Universal Resource Identifier (URI) corresponding to the media resource and send the media resource query request comprising the URI to the plurality of resource networks.

7. The Proxy node according to claim 5, wherein the instructions further cause the processor to:
    select at least two of the selected Cache nodes that correspond to location information of the selected Cache nodes in the response messages, according to fragment storage information of a stored media resource and fragment storage information of the media resource that corresponds to the selected Cache nodes in the response messages; and
    convert a mode for requesting the media resource of the selected Cache nodes in the response messages into pull/push operational primitives.

8. The Proxy node according to claim 7, wherein the instructions further cause the processor to request media transmission from the selected Cache nodes through the pull/push operational primitives, according to the location information of the selected Cache nodes.

9. The Proxy node according to claim 5, wherein the instructions further cause the processor to receive media streams sent by the selected Cache nodes, and send the media streams to the Client node through the Real Time Streaming Protocol (RTSP).

10. An access device, comprising:
    a processor; and
    a non-transitory computer readable medium storing instructions that cause the processor to:
    receive a media resource request message sent by a Client node, wherein a media resource is identified in the media resource request message;

send a media resource query request corresponding to the media resource request message to a plurality of resource networks;

obtain a plurality of response messages in response to the media resource query request from the resource networks;

select a plurality of Cache nodes storing the media resource according to the response messages;

request the media resource from the selected Cache nodes;

obtain a plurality of media streams that correspond to the media resource from the selected cache nodes;

combine the media streams that correspond to the media resource; and send the combined media streams to the Client node.

11. An access server, comprising:

a processor; and a non-transitory computer readable medium storing instructions that cause the processor to:

receive a media resource request message sent by a Client node, wherein a media resource is identified in the media resource request message;

send a media resource query request corresponding to the message to a plurality of resource networks;

obtain a plurality of response messages in response to the media resource query request from the plurality of resource networks;

select a plurality of Cache nodes storing the media resource according to the response messages;

request the media resource from the selected Cache nodes;

obtain a plurality of media streams that correspond to the media resource from the selected cache nodes;

combine the media streams that correspond to the media resource; and send the combined media streams to the Client.

12. A system for streaming media data distribution, comprising:

a Proxy node configured to:

receive a media resource request message sent by a Client node, wherein a media resource is identified in the media resource request message;

send a media resource query request corresponding to the message;

select a plurality of Cache nodes storing the media resource according to a plurality of response messages;

request the media resource from the selected Cache nodes;

obtain a plurality of media streams that correspond to the media resource from the selected cache nodes;

combine the media streams that correspond to the media resource; and send the combined media streams to the Client; and a plurality of resource networks configured to send the response messages in response to the media resource query request to the Proxy node.

13. The system for streaming media data distribution according to claim 12, wherein the Proxy node is further configured to obtain a Universal Resource Identifier (URI) corresponding to the media resource, and send the media resource query request comprising the URI to the plurality of resource networks.

14. The system for streaming media data distribution according to claim 12, wherein the Proxy node is further configured to select at least two of one of the selected Cache nodes that corresponds to location information of the selected Cache nodes in the response messages, according to fragment storage information of a stored media resource and fragment storage information of the media resource that corresponds to the selected Cache nodes in the response message.

15. The system for streaming media data distribution according to claim 12, wherein the Proxy node is further configured to convert a mode for requesting the media resource of the selected Cache nodes in the response messages into pull/push operational primitives and request media transmission from the selected Cache nodes through the pull/push operational primitives, according to location information of the selected Cache nodes.

16. The system for streaming media data distribution according to claim 12, wherein the resource networks comprise a plurality of different multicast networks, wherein the system further comprises a Cache node group that comprises two or more selected Cache nodes, and wherein the selected Cache nodes are configured to cache the media resource and register cached media resource information with the plurality of different multicast networks of the plurality of resource networks.

* * * * *

UNITED STATES PATENT AND TRADEMARK OFFICE
CERTIFICATE OF CORRECTION

| | | |
|---|---|---|
| PATENT NO. | : 8,812,715 B2 | Page 1 of 2 |
| APPLICATION NO. | : 13/340089 | |
| DATED | : August 19, 2014 | |
| INVENTOR(S) | : Guangyu Shi et al. | |

It is certified that error appears in the above-identified patent and that said Letters Patent is hereby corrected as shown below:

In the claims:

Column 11, lines 59-67, claim 3, should read as:
"3. The method according to claim 1, wherein selecting the Cache nodes that store the media resource according to the response messages comprises selecting at least two of the selected Cache nodes that correspond to location information of the selected Cache nodes in the response messages, according to a fragment storage information of a stored media resource and a fragment storage information of the media resource that corresponds to the selected Cache nodes in the response message."

Column 13, lines 15-34, claim 11, should read as:
"11. An access server, comprising:
    a processor; and
    a non-transitory computer readable medium storing instructions that cause the processor to:
    receive a media resource request message sent by a Client node, wherein a media resource is identified in the media resource request message;
    send a media resource query request corresponding to the message to a plurality of resource networks;
    obtain a plurality of response messages in response to the media resource query request from the plurality of resource networks;
    select a plurality of Cache nodes storing the media resource according to the response messages; [[and]]
    request the media resource from the selected Cache nodes;
    obtain a plurality of media streams that correspond to the media resource from the selected cache nodes;
    combine the media streams that correspond to the media resource; and
    send the combined media streams to the Client node."

Signed and Sealed this
Ninth Day of December, 2014

Michelle K. Lee
*Deputy Director of the United States Patent and Trademark Office*

CERTIFICATE OF CORRECTION (continued)
U.S. Pat. No. 8,812,715 B2

In the claims:

Column 13, line 35, through Column 14, line 12, claim 12, should read as:
"12. A system for streaming media data distribution, comprising:
a Proxy node configured to:
    receive a media resource request message sent by a Client node, wherein a media resource is identified in the media resource request message;
    send a media resource query request corresponding to the message;
    select a plurality of Cache nodes storing the media resource according to a plurality of response messages;
    request the media resource from the selected Cache nodes;
    obtain a plurality of media streams that correspond to the media resource from the selected cache nodes;
    combine the media streams that correspond to the media resource; and
    send the combined media streams to the Client node; and
a plurality of resource networks configured to send the response messages in response to the media resource query request to the Proxy node."

Column 14, lines 19-26, claim 14, should read as:
"14. The system for streaming media data distribution according to claim 12, wherein the Proxy node is further configured to select at least two of the selected Cache nodes that corresponds to location information of the selected Cache nodes in the response messages, according to fragment storage information of a stored media resource and fragment storage information of the media resource that corresponds to the selected Cache nodes in the response message."

UNITED STATES PATENT AND TRADEMARK OFFICE
CERTIFICATE OF CORRECTION

| | | |
|---|---|---|
| PATENT NO. | : 8,812,715 B2 | Page 1 of 2 |
| APPLICATION NO. | : 13/340089 | |
| DATED | : August 19, 2014 | |
| INVENTOR(S) | : Guangyu Shi et al. | |

It is certified that error appears in the above-identified patent and that said Letters Patent is hereby corrected as shown below:

In the claims:

Column 11, lines 59-67, claim 3, should read as:
"3. The method according to claim 1, wherein selecting the Cache nodes that store the media resource according to the response messages comprises selecting at least two of the selected Cache nodes that correspond to location information of the selected Cache nodes in the response messages, according to a fragment storage information of a stored media resource and a fragment storage information of the media resource that corresponds to the selected Cache nodes in the response message."

Column 13, lines 15-34, claim 11, should read as:
"11. An access server, comprising:
    a processor; and
    a non-transitory computer readable medium storing instructions that cause the processor to:
    receive a media resource request message sent by a Client node, wherein a media resource is identified in the media resource request message;
    send a media resource query request corresponding to the message to a plurality of resource networks;
    obtain a plurality of response messages in response to the media resource query request from the plurality of resource networks;
    select a plurality of Cache nodes storing the media resource according to the response messages;
    request the media resource from the selected Cache nodes;
    obtain a plurality of media streams that correspond to the media resource from the selected cache nodes;
    combine the media streams that correspond to the media resource; and
    send the combined media streams to the Client node."

This certificate supersedes the Certificate of Correction issued December 9, 2014.

Signed and Sealed this
Fourteenth Day of April, 2015

Michelle K. Lee
*Director of the United States Patent and Trademark Office*

CERTIFICATE OF CORRECTION (continued)
U.S. Pat. No. 8,812,715 B2

In the claims:

Column 13, line 35, through Column 14, line 12, claim 12, should read as:
"12. A system for streaming media data distribution, comprising:
a Proxy node configured to:
    receive a media resource request message sent by a Client node, wherein a media resource is identified in the media resource request message;
    send a media resource query request corresponding to the message;
    select a plurality of Cache nodes storing the media resource according to a plurality of response messages;
    request the media resource from the selected Cache nodes;
    obtain a plurality of media streams that correspond to the media resource from the selected cache nodes;
    combine the media streams that correspond to the media resource; and
    send the combined media streams to the Client node; and
a plurality of resource networks configured to send the response messages in response to the media resource query request to the Proxy node."

Column 14, lines 19-26, claim 14, should read as:
"14. The system for streaming media data distribution according to claim 12, wherein the Proxy node is further configured to select at least two of the selected Cache nodes that corresponds to location information of the selected Cache nodes in the response messages, according to fragment storage information of a stored media resource and fragment storage information of the media resource that corresponds to the selected Cache nodes in the response message."